US009970357B2

(12) United States Patent
Fletcher et al.

(10) Patent No.: US 9,970,357 B2
(45) Date of Patent: May 15, 2018

(54) SUPERELASTIC FLUID CONDUIT FOR A GAS TURBINE ENGINE

(71) Applicant: ROLLS-ROYCE PLC, London (GB)

(72) Inventors: Paul Fletcher, Rugby (GB); John Richard Webster, Derby (GB); Anthony John Moran, Paisley (GB)

(73) Assignee: ROLLS-ROYCE plc, London (GB)

(*) Notice: Subject to any disclaimer, the term of this patent is extended or adjusted under 35 U.S.C. 154(b) by 308 days.

(21) Appl. No.: 14/876,550

(22) Filed: Oct. 6, 2015

(65) Prior Publication Data
US 2016/0108818 A1    Apr. 21, 2016

(30) Foreign Application Priority Data

Oct. 20, 2014    (GB) .................................. 1418572.2

(51) Int. Cl.
*F02C 7/22*       (2006.01)
*F01D 25/04*      (2006.01)
*F16L 9/02*       (2006.01)

(52) U.S. Cl.
CPC .............. *F02C 7/222* (2013.01); *F01D 25/04* (2013.01); *F05D 2240/35* (2013.01); *F05D 2260/96* (2013.01); *F05D 2260/98* (2013.01); *F05D 2300/174* (2013.01); *F05D 2300/175* (2013.01); *F05D 2300/501* (2013.01); *F16L 9/02* (2013.01); *Y02T 50/671* (2013.01)

(58) Field of Classification Search
CPC ........ F02C 7/22; F01D 25/04; F05D 2240/35; F05D 2260/96; F05D 2260/98; F05D 2300/174; F05D 2300/175
See application file for complete search history.

(56) References Cited

U.S. PATENT DOCUMENTS

| 2009/0053068 | A1* | 2/2009 | Hardwicke | F01D 25/06 416/241 R |
| 2010/0071663 | A1 | 3/2010 | Patel et al. | |
| 2010/0276025 | A1* | 11/2010 | Sellers | F03G 7/065 138/45 |
| 2011/0150378 | A1* | 6/2011 | Care | F01D 25/164 384/438 |
| 2013/0034423 | A1* | 2/2013 | Adaickalasamy | F01D 11/18 415/1 |
| 2014/0255176 | A1* | 9/2014 | Bredenbreuker | F04D 15/0005 415/208.1 |
| 2014/0369830 | A1* | 12/2014 | Fletcher | F16C 19/10 415/229 |

FOREIGN PATENT DOCUMENTS

| CN | 202057223 U | 11/2011 |
| EP | 2 821 657 A1 | 1/2015 |
| EP | 2829707 A1 | 1/2015 |
| GB | 2462915 A | 3/2010 |

OTHER PUBLICATIONS

Apr. 9, 2015 Search Report issued in British Patent Application No. 1418572.2.

* cited by examiner

*Primary Examiner* — Steven Sutherland
(74) *Attorney, Agent, or Firm* — Oliff PLC

(57) ABSTRACT

A fluid conduit for a gas turbine engine. The conduit includes a superelastic material such as TNTZ or Ti2448. The conduit is installed such that at least part of the conduit is subject to a stress which lies in one of a superelastic and a plastic region of the material in use.

7 Claims, 4 Drawing Sheets

SUPERELASTIC FLUID CONDUIT FOR A GAS TURBINE ENGINE

FIELD OF THE INVENTION

The present invention relates to a fluid conduit for a gas turbine engine, a gas turbine engine incorporating a fluid conduit, and to a method of designing a fluid conduit for a gas turbine engine.

BACKGROUND TO THE INVENTION

FIG. 1 shows a high-bypass gas turbine engine in the form of a turbofan 10. The engine 10 comprises, in axial flow series, an air intake duct 11, an intake fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of gas turbine engine. Alternatively, the shaft power could be used to drive other mechanical loads, such as a marine propeller or an electrical generator.

Air is drawn through the air intake duct 11 by the intake fan 12 where it is accelerated. A significant portion of the airflow is discharged through the bypass duct 13 generating a corresponding portion of the engine 10 thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12 (or other load), the intermediate pressure compressor 14 and the high pressure compressor 16 via shafts 26, 28, 30. The working fluid, which has reduced in pressure and temperature, is then expelled through the exhaust nozzle 25 and generates the remaining portion of the engine 10 thrust.

FIG. 2 shows an external view of part of a conventional combustor 18 of the gas turbine engine 10. The combustor comprises a combustor liner which resides within a combustor casing 36. The combustor liner defines an annular space in which fuel is combusted. Fuel is provided to the annular space by a plurality of fuel injectors 34 located at several annular locations around the casing 36, which are in turn provided with fuel by a fuel conduit 32. The conduit 32 is connected to the injectors 34 by connectors 38. The conduit comprises a metal alloy (steel or Inconel™ for example), which provides the necessary high strength and high temperature capability to perform in the high temperature environment in which the conduit 32 operated. The conduit 32 has multiple bends and curves, as can clearly be seen in FIG. 3. These bends are necessary in order to accommodate thermal expansion of the conduit 32 without overstressing the material, which may have a strain limit of approximately 0.2 to 0.3%. these bends also provide resistance to damage from vibration, and are termed "pigtails" in the art. Bellows or flexible joints may be provided within the conduit system in order to provide further flexibility and resistance to internal pressure variations and vibration. Other types of combustors are also known, such as "staged combustors". In any case, fuel must be delivered to fuel injectors within the combustor.

Other conduits in gas turbine engines (such as hydraulic, oil and air conduits) also have to survive similar or higher temperature conditions, and are subject to large stresses, thermal gradients and vibrations in use.

In some cases, flexible tubing made of plastics material is used instead of metal alloys. Examples include PTFE. Such tubing still generally requires pig tails to damp vibration.

However, the addition of extra material to provide bends in conduits increases the weight of the conduits. Existing conduits are also prone to failure, due in part to fretting from vibration. The necessary joints, bellows and different material interfaces provide potential failure points. The unit cost of these complex arrangements is also relatively high.

The present invention describes a fluid conduit for a gas turbine engine, a gas turbine engine comprising a fluid conduit, and a method of designing a fluid conduit which seeks to overcome some or all of the above problems.

SUMMARY OF THE INVENTION

According to a first aspect of the present invention, there is provided a gas turbine engine comprising a fluid conduit comprising a superelastic material, the conduit being installed such that at least part of the conduit is subject to a stress which lies in one of a superelastic and a plastic region of the material.

Advantageously, it has been found that superelastic materials provide the necessary strength, rigidity and resistance to vibration at the necessary temperatures to provide a fluid conduit which substantially removes the need for pigtails, thus resulting in a lightweight conduit, with a long service life. Simultaneously, by installing the conduit such that it is subject to stress such that the material is in a superelastic or a plastic region of the material, the conduit is damped, reducing the need for bends in the material.

The superelastic alloy may comprise an alloy that deforms by a superelastic transformation, such as a titanium superelastic alloy. The term "superelastic" may be taken to mean that the transformation is a reversible phase transformation that occurs under stress between a parent phase (e.g. body-centred cubic titanium) and a product phase (e.g. hexagonal alpha titanium, orthorhombic alpha double prime titanium or hexagonal omega titanium).

The superelastic alloy may comprise a titanium niobium zirconium tin alloy, a titanium niobium tantalum zirconium alloy, or a shape memory alloy such as a nickel titanium alloy, or a copper aluminium nickel alloy. These alloys have been found to have a high tensile strength, while also having a strain capability. These alloys also have large hysteresis effects when stressed and released, thereby leading to large amounts of damping.

The fluid conduit may comprise one of a fuel conduit, a hydraulic conduit, an air conduit and an oil conduit. In each of these cases, at least one of the fluid and the environment in which the conduit operates is subject to high pressure, vibration and temperature, and it has been found that a fluid conduit comprising a superelastic material provides surprising advantages in each of these use cases.

Where the fluid conduit comprises a fuel conduit, the conduit may comprise a fuel manifold and a plurality of outlets for respective fuel injectors of the gas turbine engine combustor.

The conduit may comprise unequal lengths of material between outlets. Advantageously, the unequal lengths of material ensure that the resonant frequencies of the conduit differs around the annulus of the combustor, thereby helping reduce vibration of the conduit, and of further components attached thereto.

The conduit may be installed in the gas turbine engine in a pre-stressed condition, such that a load is applied to the superelastic material from the pre-stress in addition to any in use loads. Advantageously, the pre-stress ensures that the total loads (i.e. the sum of the pre-stress and in use loads) lies within the hysteresis band.

The pre-stress may be one or more of longitudinal, torsional and lateral.

The pre-stress may vary along the length of the conduit, such that areas of high vibrational stress in use are configured to be subject to a stress which lies within the hysteresis band of the material.

According to a second aspect of the present invention, there is provided a computer implemented design method comprising:

identifying location points for a fluid conduit for a gas turbine engine in accordance with the first aspect of the present invention;

defining dimensions of the conduit, the conduit having connection points for connection to the location points;

identifying damping requirements of the conduit; and determining one or more pre-loads of the conduit such that the damping requirements are met.

According to a third aspect of the present invention, there is provided a method of forming a conduit designed in accordance with the third aspect of the present invention.

Advantageously, the inventive methods of the present invention provide a design for a conduit for a gas turbine engine having increased resistance to vibration by using the inherent damping properties of superelastic materials when subjected to a vibrational stress.

The fluid conduit may comprise a fuel conduit, and one or more of the location points may comprise a connection to a fuel injector of the gas turbine engine.

The pre-load may comprise one or more of a lateral, longitudinal and torsional pre-load.

The lateral and/or longitudinal and/or torsional pre-load may be applied by determining an orientation of one or more of the location and/or connection points. For example, the lateral pre-load may be determined by defining a location point orientation which differs from the un-loaded orientation of the fluid conduit connection points in one or both of a longitudinal and a lateral sense.

The tensile pre-load may be applied by defining dimensions of an unloaded section of fluid conduit such that the end points extend a distance which differs from a distance between the connection points of the gas turbine engine. Advantageously, when the conduit is installed in the gas turbine engine, a tensile load will be applied.

The conduit may comprise three or more connection points, wherein adjacent connection points define a section therebetween. The dimensions of the conduit may be determined such that the length of each section differs from the length of the remaining sections. Advantageously, the resonant frequency of each section will differ, and so resonance of the conduit will be minimised.

The damping requirements may be met by pre-loading the conduit or conduit sections such that, in use, the sum of the pre-load and a load applied in use match a hysteresis band of the superelastic material. Advantageously, the conduit provides maximum damping for the or each section of the conduit, thereby further reducing vibrations, which may lead to reduced noise and/or increased longevity of the conduit.

DETAILED DESCRIPTION

Figure 1:
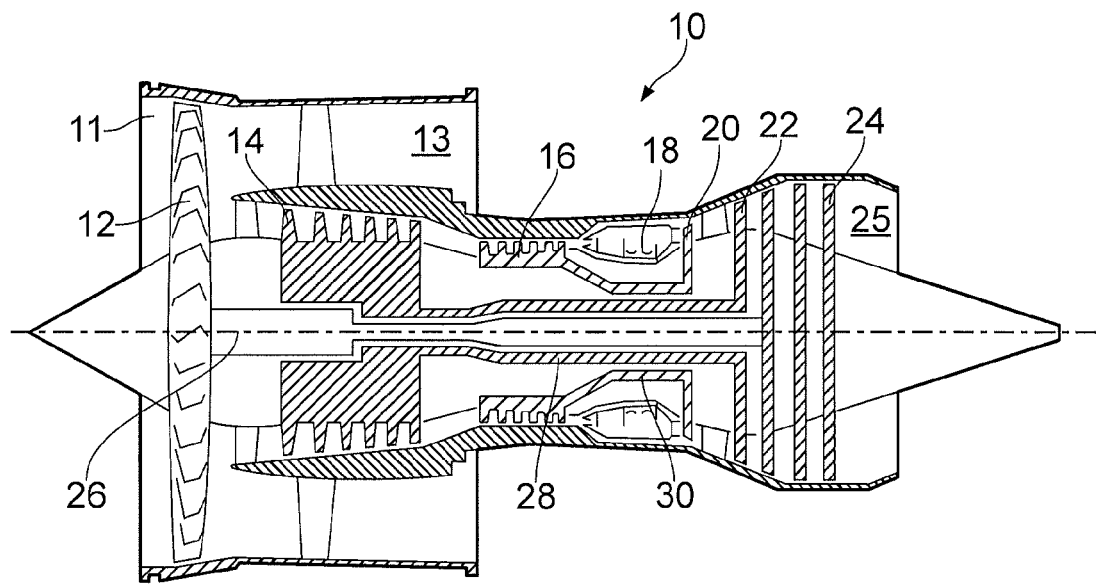
FIG. 1 shows a schematic cross sectional view of a gas turbine engine.
Figure 2:
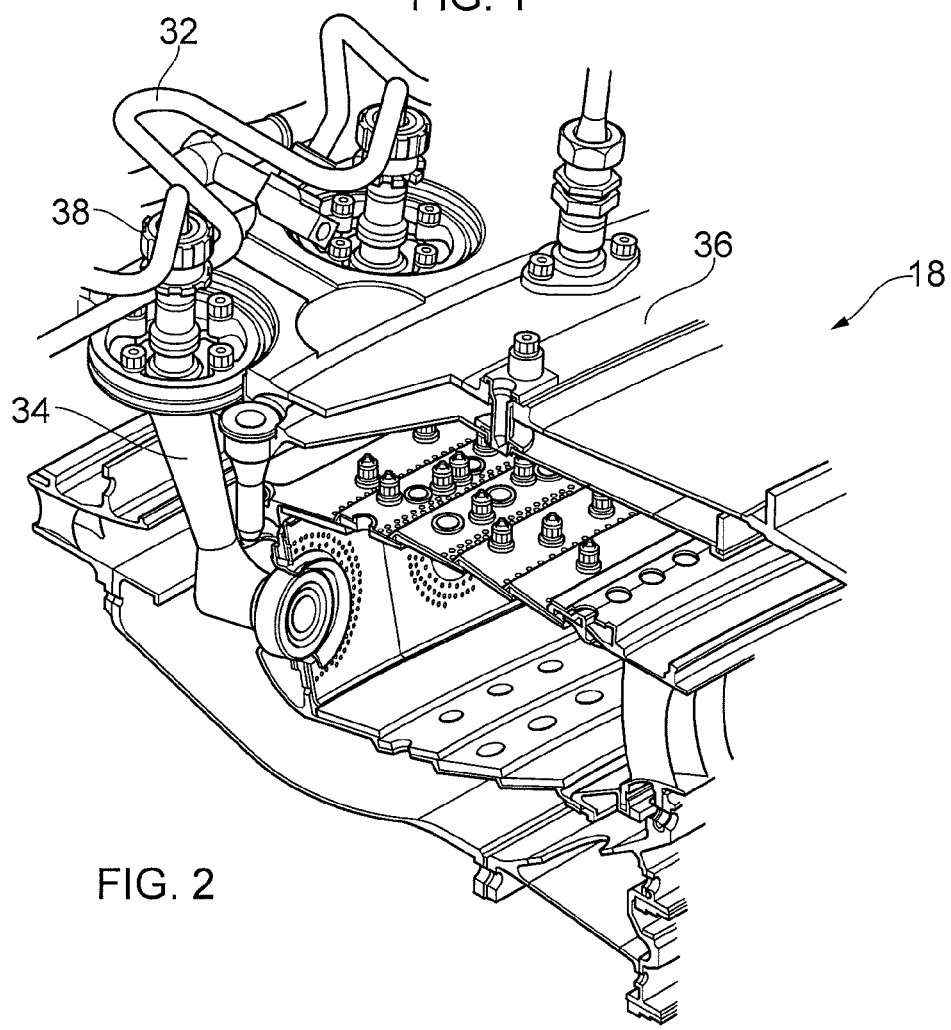
FIG. 2 shows an external view of part of a prior combustor suitable for the gas turbine engine of FIG. 1.

FIG. 1 shows a high-bypass gas turbine engine 10. The engine 10 comprises, in axial flow series, an air intake duct 11, an intake fan 12, a bypass duct 13, an intermediate pressure compressor 14, a high pressure compressor 16, a combustor 18, a high pressure turbine 20, an intermediate pressure turbine 22, a low pressure turbine 24 and an exhaust nozzle 25. The fan 12, compressors 14, 16 and turbines 20, 22, 24 all rotate about the major axis of the gas turbine engine 10 and so define the axial direction of gas turbine engine.

Air is drawn through the air intake duct 11 by the intake fan 12 where it is accelerated. A significant portion of the airflow is discharged through the bypass duct 13 generating a corresponding portion of the engine 10 thrust. The remainder is drawn through the intermediate pressure compressor 14 into what is termed the core of the engine 10 where the air is compressed. A further stage of compression takes place in the high pressure compressor 16 before the air is mixed with fuel and burned in the combustor 18. The resulting hot working fluid is discharged through the high pressure turbine 20, the intermediate pressure turbine 22 and the low pressure turbine 24 in series where work is extracted from the working fluid. The work extracted drives the intake fan 12, the intermediate pressure compressor 14 and the high pressure compressor 16 via shafts 26, 28, 30. The working fluid, which has reduced in pressure and temperature, is then expelled through the exhaust nozzle 25 and generates the remaining portion of the engine 10 thrust.

Figure 4:
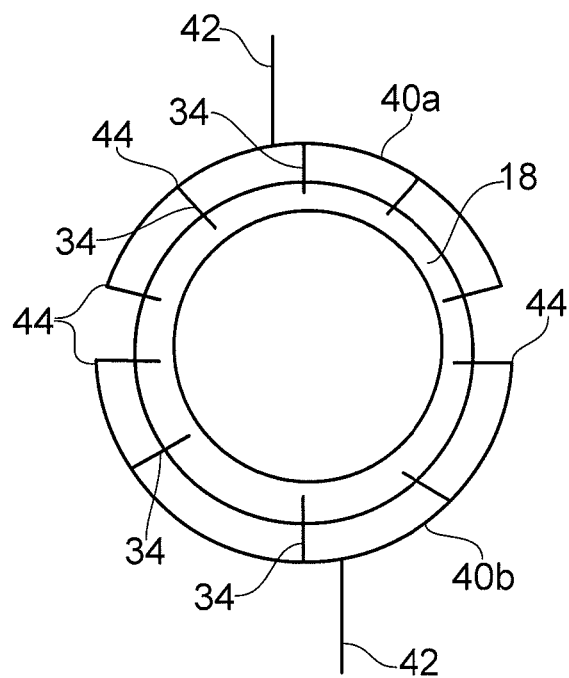
FIG. 4 shows a schematic view of a fluid conduit in accordance with the present disclosure.

FIG. 4 shows a schematic view of a fluid conduit in the form of a fuel manifold 40 for providing fuel to fuel injectors of the combustor 18.

The manifold 40 comprises a superelastic material. The superelastic alloy deforms by superelastic transformation when a stress is applied. A superelastic transformation is a substantially reversible phase transformation that occurs under stress between a parent phase (e.g. body-centred cubic titanium) and a product phase (e.g. hexagonal alpha titanium, orthorhombic alpha double prime titanium or hexagonal omega titanium). The alloy has a low elastic modulus (i.e. Young's modulus), and also a low shear modulus. The transformation between the parent and body phases may be caused by a temperature change, or by the application of stress to the material.

In one example, a superelastic titanium alloy is chosen having a low modulus at temperatures up to 300° C., and in some cases up to 400° C. The low modulus and high failure stress mean that a high strain energy can be generated when loaded, whilst still retaining sufficient strength to maintain the integrity of the manifold 40. The manifold 40 could comprise further materials, or could consist essentially of a superelastic material.

A first known suitable titanium superelastic alloy is "gum metal", also known as TNTZ. TNTZ has a nominal composition comprising, in weight per cent, 23% niobium, 0.7% tantalum, 2% zirconium, and 1% oxygen, with the balance being titanium. TNTZ can exhibit superelastic properties over a range of compositions and also include vanadium and hafnium. Such alloys may be relatively strong, with an ultimate tensile strength of around 2 GPa. The Young's modulus of gum metal can range from 20 to 60 GPa. The Shear modulus also varies, and may be as low as 20 GPa.

A second known superelastic titanium alloy comprises, in weight per cent, approximately 24% niobium, 4% zirconium and 7.5% tin, with the balance being titanium. Such a composition is sometimes referred to in the art as "Ti2448". This alloy is a β type titanium alloy, having a body centred cubic crystal parent phase structure. Nanostructured alloy having a grain size less than 50 nm has been produced by cold rolling, and has been found to be particularly suitable, having an ultimate tensile strength of approximately 500 to 1000 MPa. This superelastic titanium alloy has a Young's modulus below 80 GPa, and preferably below 60 GPa. In one example, the Young's modulus is approximately 65 GPa, and the Poisson's ratio (i.e. the negative ratio of transverse to axial strain) of the material is approximately 0.28. A damping member 50 comprising this material may be capable of relatively large strains, up to 2% in some cases, and stresses of around 500 MPa without exceeding the elastic deformation limit. This material has been found to have a coefficient of thermal expansion of approximately 0.7×10−6 mm/mm/° C. at 100° C., 1.0×10−6 mm/mm/° C. at 200° C.

A third known class of superelastic materials comprises "shape memory alloys" (SMA). SMA typically comprises either nickel titanium alloy (NiTi) or copper aluminium nickel alloy (CuAlNi). For example, Nitinol comprises approximately roughly equal amounts (by atomic percent) nickel and titanium. Nitinol has an elastic modulus of approximately 75 to 73 GPa in its Austenite phase, and approximately 28 to 40 GPa in its Martensite phase. The transition between Martensite to Austenite usually takes please at a stress which is dependent on the local temperature. Typically, the SMA have an plastic or superelastic region at between −400 MPa and 400 MPa (i.e. between a tensile stress of 400 MPa and a compressive stress of 400 MPa). Other known SMA compositions includes NiTiCu, NiTiHf, NiTiPd, which are generally suitable for higher temperatures uses.

Figure 3:
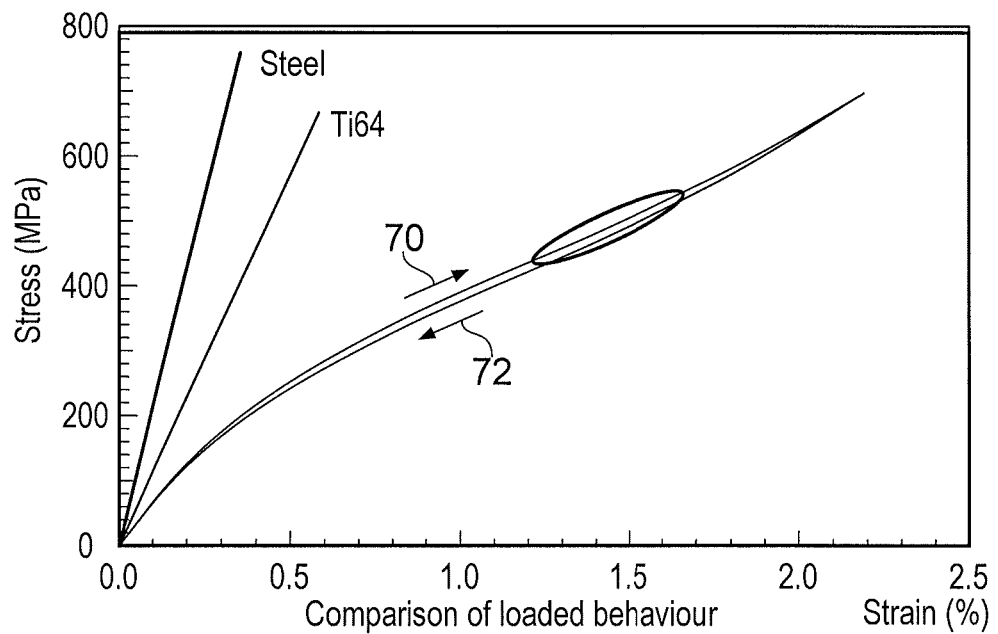
FIG. 3 is a graph showing a stress/strain relationship of a superelastic material.

FIG. 3 shows the stress/strain curve for the above superelastic titanium alloy comprising approximately 24% niobium, 4% zirconium and 7.5% tin, and also for prior conduit materials (steel and Titanium alloy (Ti64)). As can be seen, the superelastic material displays a hysteresis curve. That is to say that the material has a different stress/strain relationship when the material is loaded (as shown by arrow 70) compared to when the load is released (as shown by arrow 72). Superelastic materials in general, and this material in particular, has been found to have a hysteresis region defined by a region having a relatively low Young's modulus (i.e. a low ratio of stress to strain when a load is applied) at a stress above a critical value, in which increasing and decreasing stresses lead to relatively large hysteresis. The critical stress value for this material is approximately 200×10$^6$ Pascals (i.e. 200 MPa). Consequently, the conduit will deform to a relatively large extent when a stress greater than 200 MPa is applied.

Referring again to FIG. 4, a pair of manifolds 40a, 40b are provided for the combustor 18. A first manifold 40a provides fuel flow for fuel injectors 34 at the top half of the engine 10, while a second manifold 40b provides fuel flow for fuel injectors 34 at the bottom half of the engine 10. An inlet 42 is provided for each manifold 40a, 40b, into which fuel is drawn from a fuel pump (not shown). A plurality of outlets 44 are provided, one for each injector 34, which extend either side of the inlet 42. In this case, ten outlets 44 are provided, though substantially any number could be provided. Such an arrangement ensures that excessive fuel pressure is not required to drive fuel to the injectors 34 located at extreme ends of the manifolds 40a, 40b. The manifold 40 has an overall part annular configuration to match the annular shape of the combustor casing.

Figure 5:
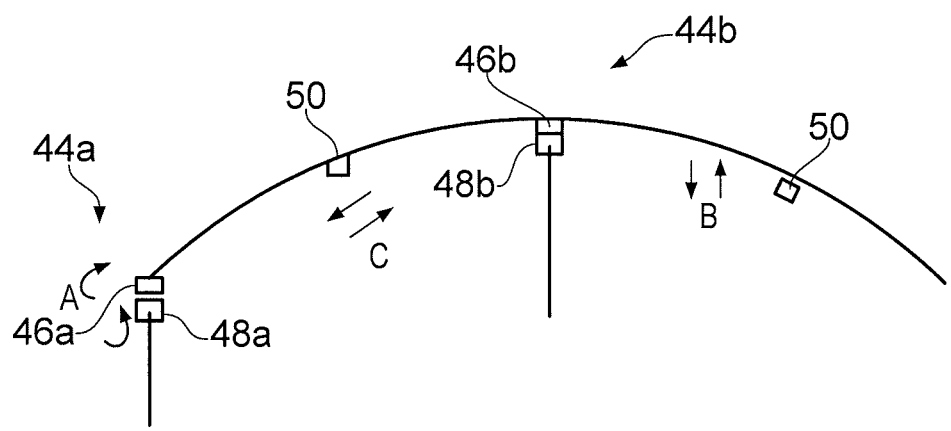
FIG. 5 is a view of part of the fluid conduit of FIG. 4 connected to a gas turbine engine.

FIG. 5 shows two of the outlets 44a, 44b in more detail. Each outlet 44 defines a connection point in the form of a bayonet fitting 46 (though other types of connector could be used). The connector 46 connected the outlet 44 to a location point defined by a corresponding connector 48 of the fuel injector 34. In this way, each of the outlets 44 is mounted to the combustor casing. Further location points defined by clips 50 may also be provided. These clips 50 reduce the length between location points, and may be necessary to adjust the resonant frequency of parts of the conduit (see description below in relation to FIG. 5), or may be necessary to maintain rigidity of the manifold 40 if the distance between fuel injectors 34 is too large.

The manifold 40 has nominal dimensions when not subjected to a load as shown in FIG. 3. However, a pre-stress can be applied to the manifold 40 (or parts thereof), such that the superelastic material is stressed when installed on the combustor casing 36 such that, in use the total stress (i.e. the sum of vibrational stresses and pre-stresses) applied to the manifold 40 lies within the hysteresis region of the superelastic material, i.e. the region where superelastic damping properties are displayed.

FIG. 5 demonstrates how pre-stresses may be applied. For example, by arranging the orientation of the bayonet fitting 46 and the corresponding connector 48 such that the outlet 44 is twisted in a longitudinal sense when fitted to the combustor casing 36, a torsional pre-stress is applied, as shown by arrows A. By arranging the relative orientations of the bayonet fitting 46 and the corresponding connector 48 such that the outlet 44 is bent in a lateral sense when fitted to the combustor casing 36, a lateral (i.e. bending) pre-stress is applied, as shown by arrows B. By arranging the distance between adjacent connection points 46a, 46b to be less than the distance between adjacent location points 48a, 48b, a tensile or compressive pre-load can be applied to the part of the conduit 40 extending between these location points 48a, 48b in use, as shown by arrows C. By applying one or more longitudinal (i.e. tensile or compressive), torsional and lateral stresses, the required pre-stress can be achieved.

Additional damping in some areas can also be achieved by, for example, applying a material treatment to different areas of the manifold 40. For example, cold rolling/cold extrusion can be used to alter the critical stress which defines the hysteresis band. The necessary Young's modulus and ultimate tensile strength can also be adjusted by cold working and heat treatment.

Figure 6:
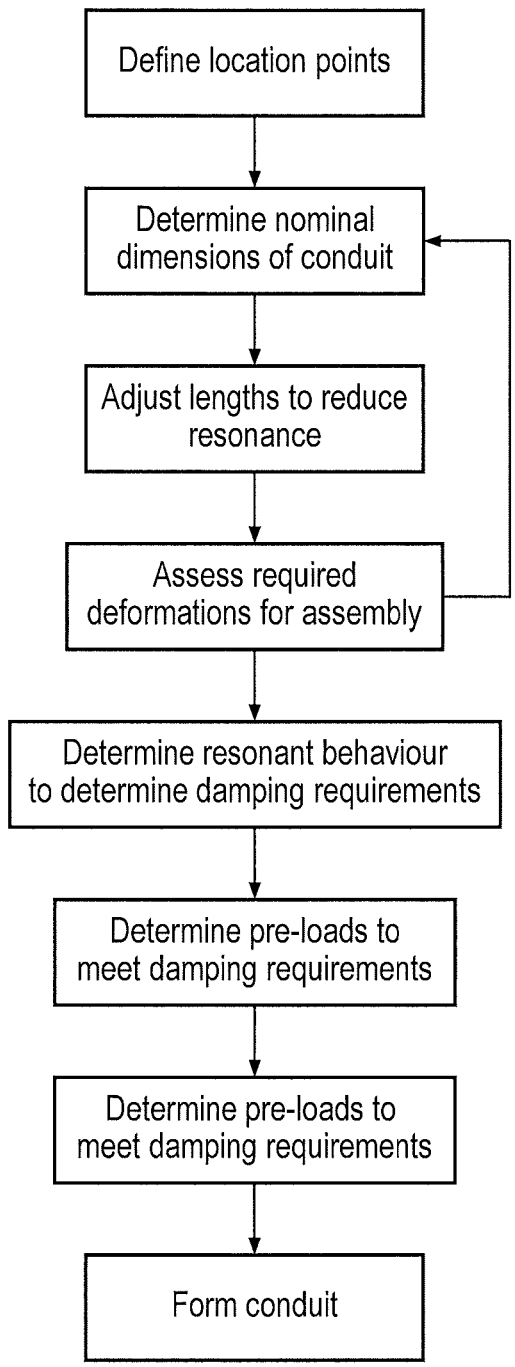
FIG. 6 is a process flow diagram illustrating a computer implemented method in accordance with the present disclosure.

The conduit 40 could be designed using a computer implemented method, as illustrated in FIG. 6.

The method is performed on a computer, and may be carried out using Computer

Assisted Design (CAD) software for example. The computer comprises an input such as a keyboard and mouse, a processor such as a general purpose CPU and connected memory, and an output such as a VDU.

In a first step, a CAD model of the required location points for the conduit is provided. For example, a model of the combustor casing 36 could be provided, which includes the dimensions and geometric locations of the location points 48 of the fuel injectors 32.

In a second step, nominal dimensions of a fluid conduit are determined, such that connection points of the conduit match the required location points. In general, this will be a straight path, unless constrained by geometric restrictions of the gas turbine engine. In one example, the nominal dimensions of the fluid conduit are generally curved to match the curvature of the combustor casing 36.

In a third step, the lengths of each section of the conduit extending between adjacent location points is determined. If any of these lengths match within a predefined margin (such as, for example, 5%), then the lengths of one of these sections is altered to increase the length of the section by, for example, introducing an additional curvature. This step ensures that system wide resonance coupling with the liquid in the conduit is avoided. In some cases, this step may be omitted.

In a fourth step, the deformations necessary for assembly are assessed. For example, the conduit may need to be bent in order to fit within the area surrounding the combustor casing (or other parts of the gas turbine engine where the conduit is for one of air, oil and hydraulic fluid). This deformation is checked against the maximum strain capabilities of the material of the conduit. If the deformation exceeds a maximum force that can be applied by a user, or the maximum stress or strain of the material, the process returns to step two or step three, where the nominal dimensions of the conduit are changed, before returning again to step four. Alternatively, the user may be informed that the dimension requirements of the conduit cannot be met with the current material. The user may then select a different material, or make design changes to the engine 10 to accommodate the strain restrictions of the material.

In a fifth step, a model of the nominally dimensioned conduit is used to determine the resonant behaviour of the conduit in use. This resonant behaviour could be predicted by Finite Element Analysis (FEA) software for example. This resonant behaviour is compared to a required resonant behaviour to determine damping requirements for the conduit. For example, the resonance of the nominally dimensioned conduit may have a frequency distribution or magnitude which lies outside of acceptable boundaries.

In a sixth step, the nominally dimensioned conduit is altered by providing pre-loads such that the damping requirements are met. For example, the conduit (or parts thereof) may be twisted, bent or tensioned to obtain a required hysteresis response of the material, and therefore a required damping. In general, it is desirable that only part of the conduit is subjected to a preload (such as less than 60% for example). A preload of approximately 40 to 50% of ultimate tensile stress of the material has been found to be adequate in most cases. Alternatively, instructions for material alterations such as heat treatments or different material compositional specifications could be produced.

In a seventh step, physical conduit is produced having the determined dimensions and material properties. This conduit is then installed and tested before entry into service. During service, the conduit may be monitored (for example by stress/strain sensors) to ensure that the conduit does not exceed required parameters.

In some cases, one or more of these steps may be omitted. For example, the third step may be found to be unnecessary, depending on the effectiveness of the damping properties of the conduit material.

Accordingly, the present disclose provides a fluid conduit and a computerised method of designing the conduit, that is capable of resisting and damping vibrations, while also being of light weight, and being capable of operating for long periods reliably.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, the gas turbine engine could comprise any number of shafts. The fan could be replaced by a different load such as a gearbox driving a helicopter rotor blade or marine propeller, or an electrical generator.

Aspects of any of the embodiments of the invention could be combined with aspects of other embodiments, where appropriate.

The invention claimed is:

1. A gas turbine engine comprising a fluid conduit comprising:
   a superelastic material;
   a fuel manifold; and
   a plurality of outlets for a plurality of respective fuel injectors of a gas turbine engine combustor, wherein at least part of the fluid conduit is subject to a stress which lies in one of a superelastic and a plastic region of the superelastic material.

2. A gas turbine engine according to claim 1 wherein the superelastic material comprises a titanium superelastic alloy.

3. A gas turbine engine according to claim 2, wherein the superelastic alloy comprises one of a titanium niobium zirconium tin alloy, a titanium niobium tantalum zirconium alloy, nickel titanium alloy, and a copper aluminium nickel alloy.

4. A gas turbine engine according to claim 1, wherein connection points of the fluid conduit are configured such that, when installed, at least part of the fluid conduit is subject to a stress which lies in a non-linear Young's modulus region of the fluid conduit.

5. A gas turbine engine according to claim 1, wherein the fluid conduit comprises unequal lengths of material between outlets.

6. A gas turbine engine according to claim 1, wherein the stress is one or more of longitudinal, torsional and lateral.

7. A gas turbine engine according to claim 1, wherein the stress varies along a length of the fluid conduit, such that areas of high vibrational stress in use are configured to be subject to a stress which lies within a hysteresis band of the fluid conduit.

* * * * *